US008968445B2

(12) United States Patent
Lindahl et al.

(10) Patent No.: US 8,968,445 B2
(45) Date of Patent: Mar. 3, 2015

(54) REGENERABLE PLEATED FILTER MEDIUM

(75) Inventors: Christian Lindahl, Hagersten (SE); Guillaume Gallet, Perak (MY); Mikael Forslund, Bromma (SE)

(73) Assignee: Camfil AB, Trosa (SE)

( * ) Notice: Subject to any disclaimer, the term of this patent is extended or adjusted under 35 U.S.C. 154(b) by 187 days.

(21) Appl. No.: 13/254,148

(22) PCT Filed: Mar. 2, 2010

(86) PCT No.: PCT/SE2010/050242
§ 371 (c)(1),
(2), (4) Date: Nov. 17, 2011

(87) PCT Pub. No.: WO2010/101520
PCT Pub. Date: Sep. 10, 2010

(65) Prior Publication Data
US 2012/0067215 A1 Mar. 22, 2012

Related U.S. Application Data

(60) Provisional application No. 61/156,550, filed on Mar. 2, 2009.

(30) Foreign Application Priority Data

Mar. 2, 2009 (SE) .................................... 0950106-5

(51) Int. Cl.
*B01D 53/02* (2006.01)
*B01D 46/52* (2006.01)
(Continued)

(52) U.S. Cl.
CPC .......... *B01D 46/521* (2013.01); *B01D 39/1623* (2013.01); *B01D 46/0036* (2013.01);
(Continued)

(58) Field of Classification Search
USPC .......... 96/134, 154, 487, 488, 489, 524, 521, 96/482, 485; 95/90, 141, 286, 287; 55/385.2
See application file for complete search history.

(56) References Cited

U.S. PATENT DOCUMENTS 4,250,172 A 2/1981 Hausheer
4,597,784 A * 7/1986 Albrecht et al. ................. 55/378
(Continued)

FOREIGN PATENT DOCUMENTS

DE 19805011 A1 8/1999
EP 158748 A2 * 10/1985 ............. B01D 53/34
(Continued)

OTHER PUBLICATIONS

V. Ratta, Crystallization, Morphology, Thermal Stability and Adhesive Properties of Novel High Performance Semicrystalline Polyimides, Ph.D. Thesis, Faculty of Virginia Polytechnic Institute and State University, 1999, Chapter 1.*
(Continued)

*Primary Examiner* — Duane Smith
*Assistant Examiner* — Cabrena Holecek
(74) *Attorney, Agent, or Firm* — Patterson & Sheridan, LLP

(57) ABSTRACT

The present invention provides regenerable pleated media and filter elements and combinations thereof for use in a clean room environment for removal of airborne molecular contamination. Disclosed is a pleated filter media for a clean room environment wherein the pleated filter media comprises at least an adsorbent first layer of activated carbon or polymer wherein said activated carbon or polymer together with fibers and/or an adhesion agent is enclosed between two second layers of non woven with a grid positioned on at least one side of either of the second layers or incorporated in the first layer for preventing deformation of the pleated filter media when regenerated by a heated air flow above 100° C. at 1 atm.

16 Claims, 5 Drawing Sheets

1. Support grid
2. Non-Woven
3. Adsorbent

(51) Int. Cl.
*B01D 39/16* (2006.01)
*B01D 46/00* (2006.01)

(52) U.S. Cl.
CPC ............ *B01D46/0063* (2013.01); *B01D 53/02* (2013.01); *B01D 2239/0407* (2013.01); *B01D 2239/065* (2013.01); *B01D 2239/0654* (2013.01); *B01D 2253/102* (2013.01); *B01D 2253/202* (2013.01); *B01D 2253/34* (2013.01); *B01D 2259/4508* (2013.01); *B01D 2279/51* (2013.01)
USPC ................... 95/141; 96/134; 96/154; 55/486; 55/524; 95/286; 95/287

(56) References Cited

U.S. PATENT DOCUMENTS

| | | | |
|---|---|---|---|
| 5,605,746 | A | 2/1997 | Groeger |
| 6,200,368 | B1 * | 3/2001 | Guerin et al. ................... 96/135 |
| 6,964,695 | B2 | 11/2005 | Place et al. |
| 2002/0178923 | A1 * | 12/2002 | Kishovich et al. ............. 96/135 |
| 2004/0024074 | A1 | 2/2004 | Tennison et al. |
| 2004/0083695 | A1 * | 5/2004 | Schultink et al. .............. 55/382 |
| 2005/0204714 | A1 | 9/2005 | Sundet et al. |
| 2008/0134898 | A1 | 6/2008 | Uemura et al. |
| 2009/0019824 | A1 * | 1/2009 | Lawrence ....................... 55/497 |
| 2010/0212071 | A1 * | 8/2010 | Bohringer et al. ................ 2/400 |

FOREIGN PATENT DOCUMENTS

| | | | | |
|---|---|---|---|---|
| JP | 2000-157810 | A | 6/2000 | |
| JP | 2002-361014 | A | 12/2002 | |
| JP | 2004-223488 | A | 8/2004 | |
| JP | 2008-144610 | A | 6/2008 | |
| WO | WO-93/12862 | A1 | 7/1993 | |
| WO | WO-02/09847 | A2 | 2/2002 | |
| WO | WO-2008/135114 | | * 11/2008 | ............... A62D 5/00 |
| WO | WO 2008135114 | | * 11/2008 | ............... A52D 5/00 |

OTHER PUBLICATIONS

Merriam-Webster defintion of Adhere .pdf.*
EP 158748 A2 english abstract .pdf.*
Brittanica .pdf aramids.*
Merriam-Webster definition of adhesion .pdf.*
Merriam-Webster definition of adhere .pdf.*
EP 158748 A2 Eng Abstract.*
Dotmar, Operating Temperature of Plastics, (Polypropylene Operating Temperature) .pdf.*
Porex, Custom Porous Plastics & Porous Polymer Products From Porex, .pdf.*
"International Application Serial No. PCT/SE2010/050242, International Search Report mailed May 12, 2010", 5 pgs.
"Machine Translation of JP 2000-157810A, published Jun. 13, 2000", 11 pgs.
"Machine Translation of JP 2004-223488A, published Aug. 12, 2004", 8 pgs.
"European Application Serial No. 10749018.7, Office Action mailed Sep. 21, 2012", 1 pg.
"European Application Serial No. 10749018.7, Office Action mailed Dec. 2, 2013", 6 pgs.
"European Application Serial No. 10749018.7, Response filed Mar. 27, 2013 to Office Action mailed Sep. 21, 2012", 9 pgs.
"European Application Serial No. 10749018.7, Supplementary European Search Report mailed Sep. 4, 2012", 5 pgs.
"International Application Serial No. PCT/SE2010/050242, International Preliminary Report on Patentability dated Sep. 6, 2011", 6 pgs.
"International Application Serial No. PCT/SE2010/050242, Written Opinion mailed May 12, 2010", 5 pgs.
"Typical Properties of Polypropylene", [online]. Retrieved from the Internet: <URL: uploads/pdf/Polypropylene_Data.pdf>, (Accessed on Dec. 19, 2013), 1 pg.
Crawford, R J., "General Properties of Plastic: Table 1.8, Typical Thermal Properties of Minerals", Plastics of Engineering, 3rd Edition, Butterworth-Heinemann, (1998), p. 31.
Klein, Rolf, "Chapter 1: Material Properties of Plastics", Laser Welding of Plastics, Wiley-VCH Verlag GmbH & Co. KGaA. [online]. Retrieved from the Internet: <URL: http://www.wiley-vch.de/books/sample/3527409726_c01.pdf>, (Oct. 2011), 3-69.

* cited by examiner

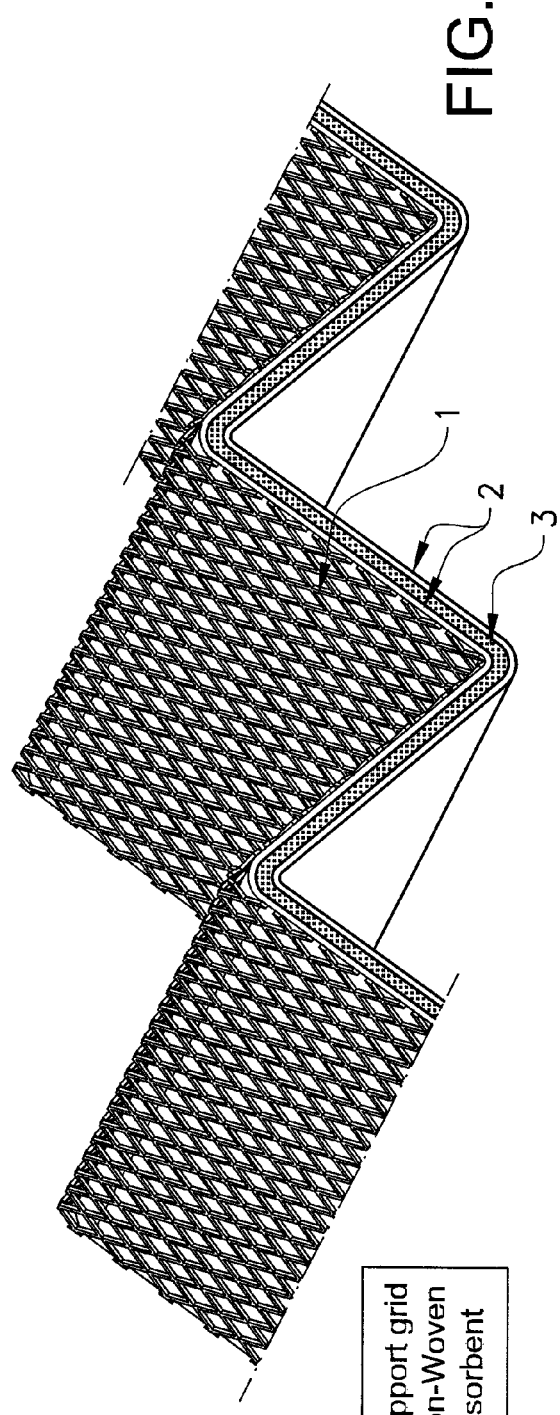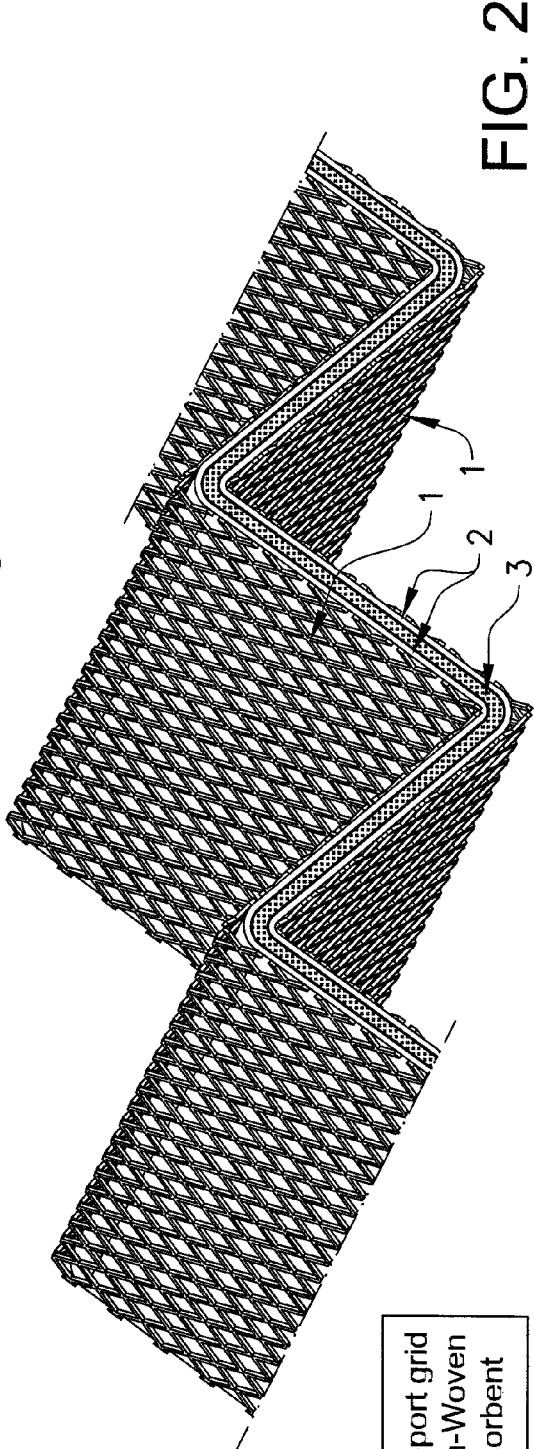

1. Support grid
2. Non-Woven
3. Adsorbent

REGENERABLE PLEATED FILTER MEDIUM

RELATED APPLICATIONS

This application is a nationalization under 35 U.S.C. 371 of PCT/SE2010/050242, filed Mar. 2, 2010 and published as WO 2010/101520 A1 on Sep. 10, 2010, which claims priority to Sweden Patent Application No. 0950106-5, filed Mar. 2, 2009 and to U.S. Provisional Application No. 61/156,550, filed Mar. 2, 2009; which applications and publications are incorporated herein by reference in their entirety.

BACKGROUND OF THE INVENTION

In the area relating to clean rooms and the microelectronic industry the removal of Airborne Molecular Contamination (AMC) in the form of Acids, Bases, Condensables, Dopants, Oxidants and Volatile Organic Compounds (VOC) is achieved by molecular filter and filter elements. AMC may cause corrosion of process wafers, circuit boards, tools, instruments etc. AMC can also cause doping errors, nucleation errors, lithography process related defects, hazing of wafers, optics, lenses and numerous other problems that may generate yield losses in the production or damage to the production equipment.

A variety of filtration technologies are available to choose from, but these can generally be divided into five configurations.

Adsorbent powder slurry-coated nonwovens are inexpensive and have low pressure drop, but have poor adsorption performance due to the small amount of adsorbent present and the fact that much of it is covered with adhesive. This type is not typically appropriate for clean room applications.

Bulk adsorbent packed beds and panels are perhaps the best known, and are available in a wide range of price and performance combinations. These are typically large, heavy systems requiring significant labour for change out, but are especially effective for applications with relatively high contaminant levels or when a high filter efficiency must be sustained for a long period of time. However, performance can be quite variable depending on how the filters are manufactured and installed. Dusting, by-pass, and high pressure drop may also be of concern with this type of filter.

Fabrics made entirely from carbon fibres: One major shortcoming with carbon fiber filters is that they are too dirty to be used in an advanced clean room environment without a particle filter downstream, as these fibers shed. Carbon is a conductive material and shedding can lead to severe problems in a facility producing electronic components. Honeycomb filters is another type for which relatively high efficiencies can be reached while keeping a low pressure drop, but have most of the time poor adsorption performance due to the small amount of adsorbent present. Dusting is also a concern with this type of filter.

Adsorbent loaded nonwovens are a relatively new "hybrid" product typically applied in pleated form. With the proper construction and application, these products can offer extremely high value in terms of high efficiency and service life, as well as low pressure drop and ease of handling. Further, pleated filters are more flexible than the honeycomb structures described above: The pleated filters have the simple possibility to vary number of pleats or pleat heights to vary the performance at will. This is impossible with honeycomb structures for which only the height can be adjusted, with pressure drop impact, or the number of cells/cm$^2$, requiring the development of a new expensive production process. It is also much more complicated to vary the type of adsorbent than using a pleated element.

In some applications with high levels of contamination or contamination difficult to remove such as low boiling point VOC, normally a bulk adsorbent packed bed filter would be required to achieve reasonable life/service times. This kind of filters are not accepted inside a clean room (air handling units, fan filter units, minienvironments or tools) because of the pressure drop and energy costs generated. Very often existing clean rooms cannot be retrofitted with these systems without reconstruction and as a result substantial investments. Further, to protect the high level of cleanliness of the clean room, particle filters must be installed in combination with bed filters adding further pressure drop and increasing energy costs. On the other hand the use of smaller and cleaner filters results in a less attractive cost of ownership (CoO) for the customer due to very frequent filter exchanges.

The physico-chemical mechanisms involved in the removal of AMC can be described as following: The gas/vapour molecules diffuse inside the adsorbent, i.e. they move from area of high concentration to low concentration. The rate of diffusion is directly related to the difference between the two concentrations. As the internal surface of the adsorbent gets covered with gas/vapour molecules, the filter efficiency starts to decrease. The properties of the internal surface i.e the active surface groups present and most important the pore size distribution will determine which gas or vapour molecules that are withheld. When the effluent gas/vapour reaches an unacceptable level, the filter needs to be changed. Usually the filter is discarded, and a new relatively expensive filter is installed.

Regenerable filters are known in fixed installations for instance twin beds of adsorbent that are alternately in service or under regeneration. Normally, only one type of adsorbent is used in this type of systems.

WO 0209847 discloses a regenerable air cleaning device with a control system that is adapted to determine when to regenerate the filter. The Activated Carbon Fibers used in that filter will be contaminating the air with fibers and thus can not be used in a clean room environment without the use of a secondary particle filter.

New systems have started to appear that uses a honeycomb structure made of either activated carbon on a paper or ceramic structure or constructed from a base material that can be carbonized and activated as a whole. The U.S. Pat. No. 6,964,695 or EP 04724071 or U.S. Ser. No. 10/344,248, shows a carbon monolith to be regenerated by direct electrical heating. The drawback of this and other honeycomb/monolith based systems are mainly that they have a fixed geometry that only can be adapted to the filtration by elongation in the air direction and thus suffer an increased pressure drop or by enlarging the external dimensions of the actual filter which seldom is acceptable in an already constructed system or in a system trying to used standard parts.

Thus, there exists a need to overcome the problems and shortcomings with the methods and filters used today as mentioned above.

SUMMARY OF THE INVENTION

The present invention provides regenerable pleated media and filter elements and combinations thereof for use in a clean room environment for removal of airborne molecular contamination.

The present invention discloses a pleated filter media for a clean room environment characterized in that the pleated filter media comprises at least an adsorbent of activated carbon and/or polymer wherein said activated carbon or polymer together with fibers or an adhesion agent is enclosed between two layers of non-woven with a grid positioned on at least one side or in the middle of the media for preventing deformation of the pleated filter media when regenerated by a heated air flow above 100° C. at 1 atm.

The pleated filter media for a clean room environment could also be characterized in that the adsorbent of activated carbon or polymer has a pore structure that permits regeneration by a heated air flow above 100° C. at 1 atm. Usually the temperatures are between 100-190° C. or even more preferred examples are 125-190° C., 150-190° C., 150-180° C. to achieve good results.

The two second layers preferably comprises heat resistant non-woven with a grid. The pleated filter media should be resistant to melting or burning for temperatures up to at least 190° C.

Further, the pleated filter media does not release particles above an ISO Class 6 environment according to standard ISO 14644-1 when submitted to the normal air flow used for the filter.

The pleated filter media for a clean room environment could also be characterized in that the adsorbent of activated carbon has the shape of, fiber, powder, granular, pellet or beads.

The pleated filter media for a clean room environment could also be characterized in that the activated carbon is chosen from coal, coconut, polymers, and naphtha and further polymer adsorbent such as a macroporous styrene-divinyl benzene.

The pleated filter media for a clean room environment could also be characterized in that the grid is made from aluminium, steel or high temperature resistant plastic material.

The pleated filter media for a clean room environment could also be characterized in that the grid has an open area of 50-95% of the total area.

The pleated filter media for a clean room environment could also be characterized in that the grid is made in the shape of a net with an open area of 50-95% of the total area.

The pleated filter media for a clean room environment could also be characterized in that the pressure drop over the flat media is up to 75 Pa at 0.11 m/s air face velocity.

The pleated filter media for a clean room environment could also be characterized in that the fibers are heat resistant bi-component fibers.

The pleated filter media for a clean room environment could also be characterized in that the adsorbent is made of polymeric material or activated carbon material with an inner area of 500 m$^2$/g to 3000 m$^2$/g and with a micropore volume of 0.2 cm$^3$/g to 0.8 cm$^3$/g.

The filter element for a clean room environment could comprise at least one pleated filter media and a frame. Further, the filter element can also comprise a temperature resistant sealant. The sealant and frame should resist temperatures up to at least 190° C.

The pleated filter media could also be used in a filter, i.e. a filter element for a clean room environment according to any of the above features in the microelectronic industry, clean room, bare wafer, semiconductor, printed circuit board, hard disk manufacturing, flat panel manufacturing, biochips, pharmaceutical industry, food industry, hospital clean environments, IVF laboratories, solar panel manufacturing, cabinets and fume hoods.

The pleated filter media could also be used when at least two pleated filter elements are positioned in series.

The pleated filter media for a clean room environment according to any of the features above could also be characterized in that the at least two different adsorbents are selected and used in different layers within a filter element or within different filter elements to match the intended mixture of Volatile Organic Compounds to be removed.

The pleated filter media or filter element for a clean room environment according to any of the features above could also be used for removing Airborne Molecular Contamination (AMC) in the form of organic Acids, organic Bases, Condensables, Dopants, Oxidants, Volatile Organic Compounds (VOC) and all compounds which can be adsorbed by physical adsorption inside the porous structure of the adsorbent.

Use of pleated filter media or filter element for a clean room environment as disclosed above which further can be desorbed by regeneration of the filter element between 100 and 190° C.

The present invention provides a pleated filter media and a filter element for a clean room environment. The pleated filter media uses as the adsorbent; fibers, powder, granular, pellet, beads or any other shapes of activated carbon from coal, coconut, polymers, naphtha or any other sources. Also non carbonized polymer adsorbents may be used. The adsorbent or adsorbents used are selected by their different properties e.g. dimension, internal surface area and pore size distribution, to fit the intended adsorption/desorption cycle and type of AMC to be removed. The adsorbent is trapped into a non woven fabric/cloth with a support grid positioned on at least one side or in the middle of the media. This structure is pleated and formed into a filter element. The filter element may consist of a single filter element or a series of filter elements mainly characterized by their different physical properties. It will be the mixture of AMCs to be removed in a real case that determine the best combination of elements. The pleated filter media and the filter element disclosed in the present invention can be regenerated by applying heat or a combination of heat, low pressure and steam.

DESCRIPTION OF THE DRAWINGS

Other features and advantages of the invention may also be apparent from the following detailed description thereof, taken in conjunction with the accompanying drawings of which:

FIG. 1 shows a pleated filter media where the grid is positioned on one side.

FIG. 2 shows the assembly of a pleated filter media where the grid is positioned on two sides.

DETAILED DESCRIPTION OF THE INVENTION

Figure 3:
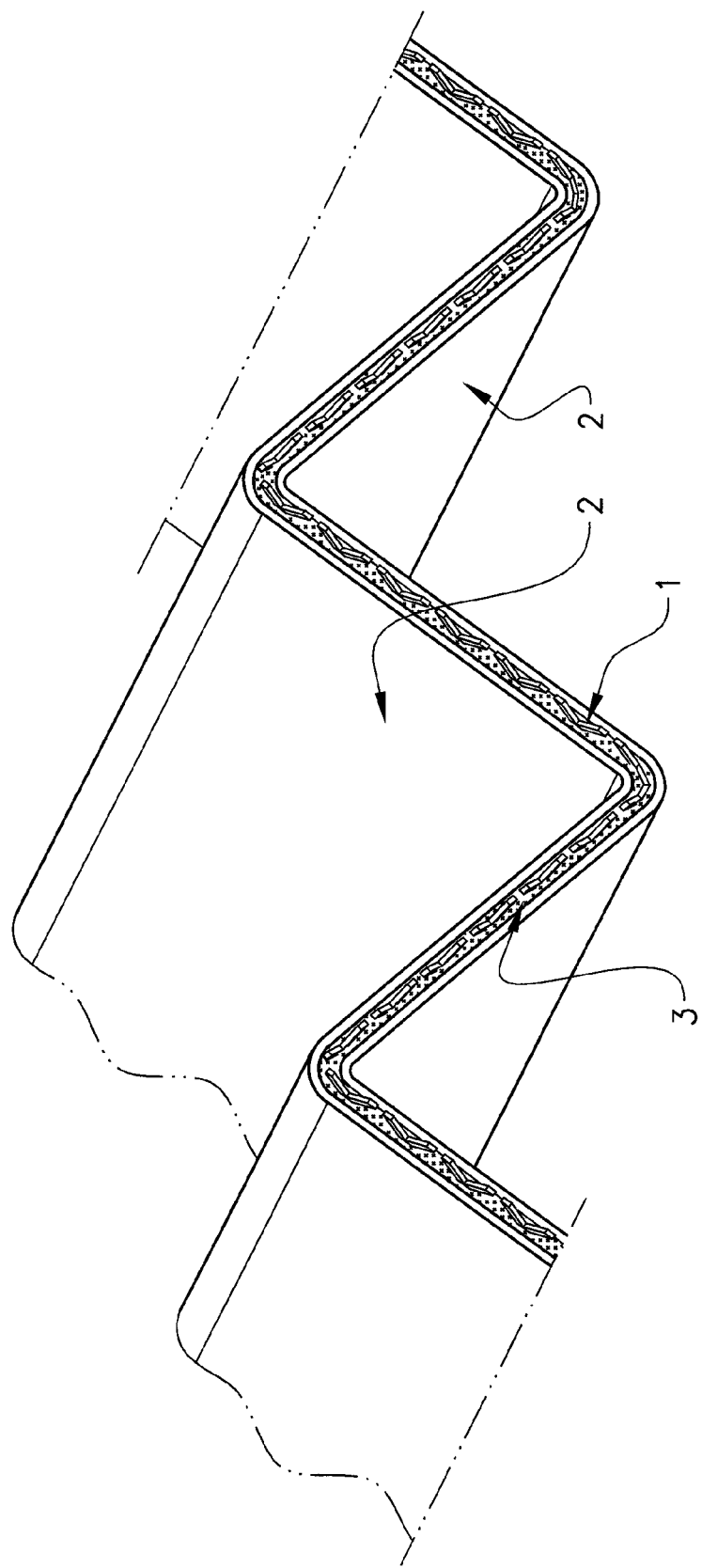
FIG. 3 shows the assembly of a pleated filter media where the grid is positioned within the adsorbent, i.e. incorporated in the adsorbent first layer.

The adsorbent can be trapped into the fabric/cloth using several embodiments. In one preferred example it has been disclosed that by using high temperature bi-component fibers which will resist heat, as well as not to include any adhesive in the filter media and the use of a support grid to the pleated filter made it possible to overcome the problems observed with the filters today.

It has been discovered that by combining an adsorbent, polyester, sealant and a grid according to the present invention the pleated filter media can be regenerated with unexpected successful results. Thus, solving the problems of the prior art filters.

One of the advantages with this pleated AMC filter media which can be regenerated is that no extra particle filter is needed on the outlet side and the pressure drop can be kept at acceptable levels for clean room usage, e.g. air handling units, fan filter units, minienvironments and process tools.

Another advantage is that the grid positioned on at least one side or in the middle of the media prevents the pleated filter from deformation when exposed to heat and air flow during regeneration. Thus, the filter does not collapse when exposed to heat and air flow.

In similar examples, high temperature adhesives can be used to trap the adsorbent in the filter media while the rest of the filter is constructed as described for the high temperature bi-component fibers filter version above.

The grid may be in any form suitable for the filter media. However, most likely a shape of a net made from aluminium, steel or high temperature resistance polymer material with a well defined open area will be used. The grid may be placed on one side of the second layers, on both sides of the layers or in the middle of the first layer.

If the open area is too small then the pressure drop will be too large. An open area should be in the range of 50-95% of the total surface area of the grid.

The pressure drop for the flat media should be up to 75 Pa at 0.11 m/s face velocity.

Some filters will only need one filter element while others will consist of several filter elements in series with the pore size distribution selected from coarse macro porous over meso porous structures to fine micro porous structures that in a cascade fashion will preferentially remove high boiling VOCs over medium boilers to low boilers. Using different, at least two adsorbents in the filter elements make it possible to remove a wide range of VOCs and to optimize the regeneration cycle and thus the number of permissible service cycles.

In a simpler fashion the same adsorbent may be used in several filter elements in series where the different elements can be regenerated a different number of cycles or positioned upstream in the series depending on the number of service cycles performed. Also, it may in some cases provide best technical function and cost of ownership to have a final element that is only regenerated once or used as a non regenerated filter.

In one example, the regenerable pleated filter media comprises a first layer of the selected adsorbent and two second layers of non woven high temperature fibers or fabric. The first layer of the selected adsorbent mixed with high temperature fibers is enclosed between said two second layers of high temperature fibers or fabric. The regenerable pleated filter media have at least one support grid positioned outer either of the second layers, or incorporated in the first layer, see FIGS. 1-3.

The present inventions regenerable pleated filter media or filter element provides low pressure drop, long life time a small form factor and a clean product. It also allows the removal of low boiling points VOC for which no economical solutions existed in the past. The use of a filter with a single or a series of filter elements which is regenerated several times, makes the removal of low boiling point VOC affordable.

Since the filter media or filter elements can be used several times the cost of ownership is reduced while keeping the performance necessary for the application.

The main use of the filter media or filter element is clean rooms or microelectronic industry such as bare wafer, semiconductor, printed circuit board, hard disk manufacturing, flat panel manufacturing, biochips, and similar. A microelectronic clean room environment includes for example, a semiconductor processing tool like a scanner in lithography area coater developers, diffusion furnaces, minienvironments, tool interfaces, metal deposition equipments, and similar. The filters can also be installed inside air handling units (fresh air, or recirculation air) or on the top of clean room fan filter units.

However, the filter media or filter elements could be used in other applications such as pharmaceutical companies for smell or control of dangerous compounds, food industry, hospital clean environments, IVF laboratories and solar panel manufacturing. The filter media or filter elements can also be used for laminar flow or safety cabinets, fume hoods, airports, and in hospital applications to protect physicians and patients during surgery.

FIG. 1 is a representation of a regenerable pleated filter media of the invention where the grip is positioned on one side of the non woven. The cross section shows the high temperature fibers and the adsorbent positioned between.

FIG. 2 discloses an example of a pleated filter media with a grid positioned on both sides of the filter.

FIG. 3 discloses an example of the assembly of a pleated filter media with a grid positioned within the adsorbent enclosed between the non-woven layers.

Figure 4:
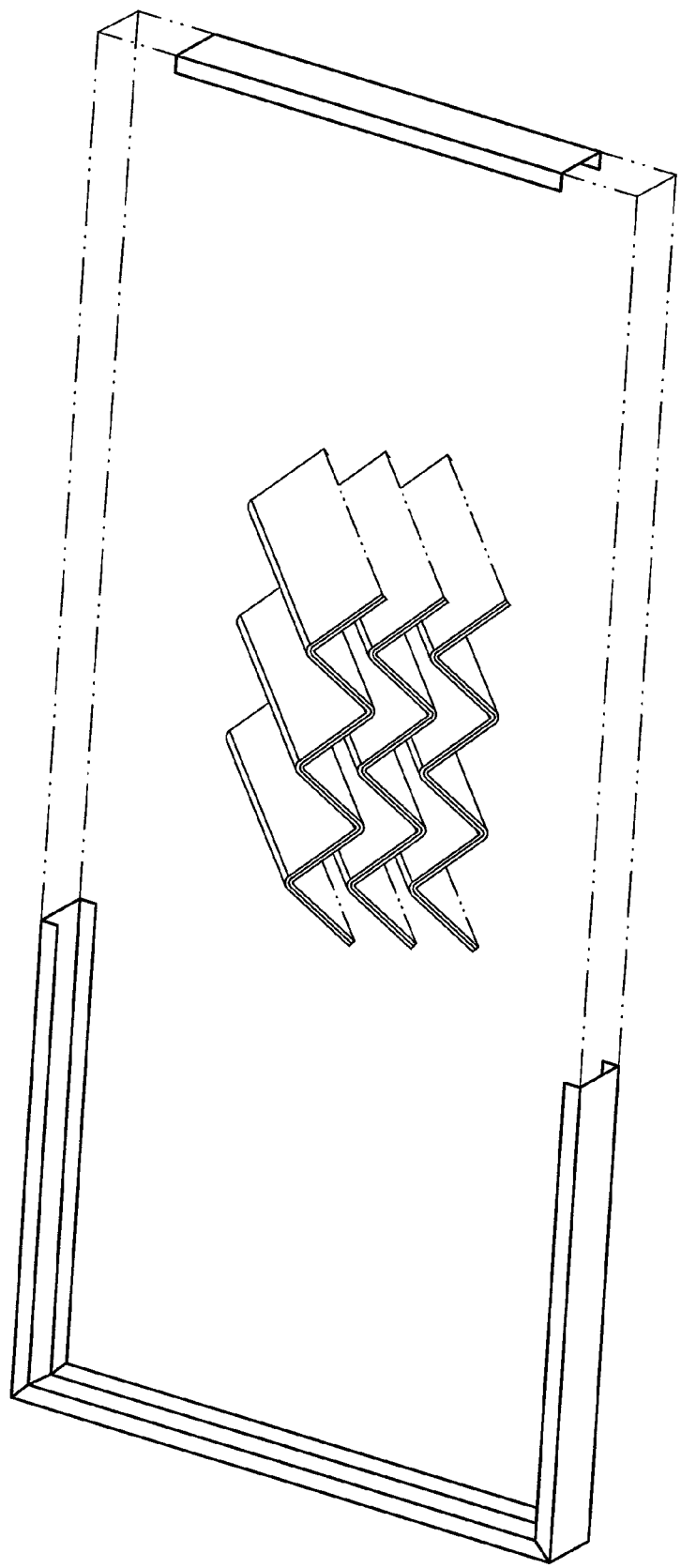
FIG. 4 shows a filter element with the pleated filter media to be incorporated in a frame adjusted to fit the pleated filter media.

FIG. 4 shows a filter element with the pleated filter media to be incorporated in a frame adjusted to fit the pleated filter media and thus forming a filter element. The frame can be constructed in different ways. Frames used for pleated filters media according to the invention can be constructed by the skilled person in the filed depending upon the used pleated filter media.

Figure 5:
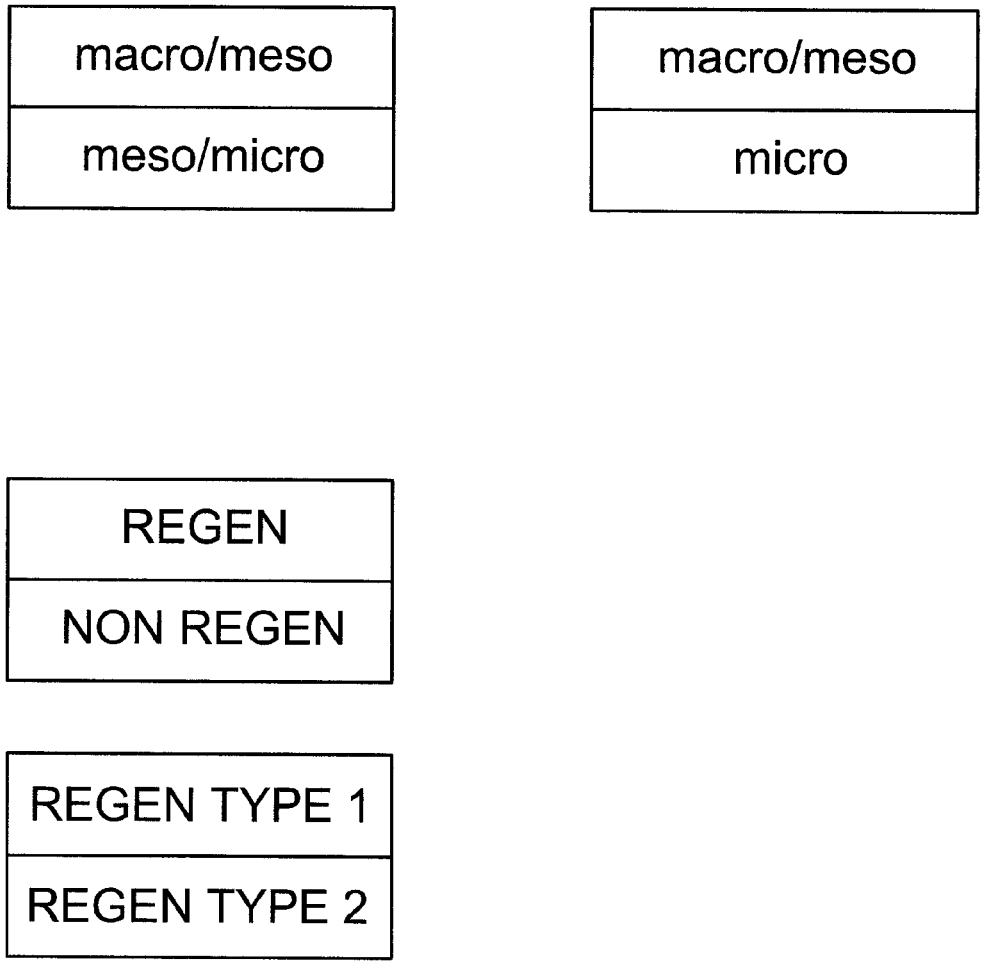
FIG. 5 shows different filter elements used in a deliberate serial order cascade.

FIG. 5 discloses 2 examples of separate layers of regenerable media in separate filter modules/subframes or within the same non woven media using adsorbents with different pore distribution. Further, example of separate layers in separate filter modules/subframes or within the same non woven media, using combination of regenerable media with non regenerable media, or different types of regenerable media All materials are resistant to melting or burning for temperatures up to 200° C. and the pleated filter media is not releasing particles above an ISO Class 6 environments as defined by ISO standard 14644-1.

The test duct is of the type used in filter tests based on the ASHRAE standard 52-76, Eurovent 4/5. The intake air is cleaned using an absolute filter of the type 1D 1000 (99.99% retention for 0.3 μm, DOP test aerosol).

The particle analysis is carried out with a LAS-X particle counter (a direct-reading instrument) produced by PMS Inc.

Before measurements are taken, the test duct and chamber are cleaned. Sampling probes are positioned in the duct. The ventilation system is started and operated without the test filter. The particle content is measured using a direct-reading instrument for 10 minutes in order to check that the duct is free of particles. After this initial blank the ventilation system is switched off. The airflow is set to the nominal value for the product and the particle sampling is adjusted so that the measurement is isokinetic. Measurements are started a few seconds after positioning the filter.

1. The 10 minutes cleaning is then reported as a reference.
2. Initial particles shedding are carried out during 10 minutes (20 sec interval).
3. The test will then continue for an additional 20 minutes (20 sec interval).
Results are presented as a table (see below).

| Particle size [μm] | Blank [p/dl] | With filter [p/dl] | Shedding [p/dl] | Shedding [p/m³] | ISO class | Limits ISO class 6 |
|---|---|---|---|---|---|---|
| 0.1-0.12 | 3 | 9.667 | 6.667 | 66670 | 426740 | <1000000 |
| 0.12-0.15 | 5 | 13 | 8 | 80000 | | |
| 0.15-0.2 | 8.33 | 19.67 | 11.34 | 113400 | | |
| 0.2-0.25 | 2.33 | 9.33 | 7 | 70000 | 166670 | <237000 |
| 0.25-0.35 | 3 | 8 | 5 | 50000 | 96670 | <102000 |
| 0.35-0.45 | 0 | 3 | 3 | 30000 | | |
| 0.45-0.6 | 0 | 1.667 | 1.667 | 16670 | 16670 | |
| 0.6-0.75 | 0 | 0 | 0 | 0 | | |

The higher the temperature used for regeneration, the better the removal of all types of organic compounds from the surface of the activated carbon through desorption mechanisms. To effectively remove adsorbed organic compounds temperatures above the compounds boiling point must be used.

Practically, a good maximum temperature used for the regeneration of clean room filters is in the interval 150 to 180° C. as the majority of the compounds adsorbed in the filter media have a boiling point (b.p.) below these values. Thus good results could be achieved in that interval.

Several different temperature intervals were tested 125-180, 125-150, 150-180, 160-180° C. Good results were observed with temperatures above 125° C. and especially above 150° C.

Examples of important organic compounds adsorbed inside the filter, together with their boiling points include: Hexamethyldisiloxane (b.p. 101° C.), toluene (b.p. 111° C.), butyl acetate (b.p. 126° C.), ethyl benzene (b.p. 136° C.), xylene (b.p. 144° C.), PGMEA (b.p. 146° C.), ethyl lactate (b.p. 154° C.), trimethyl benzene (b.p. 165° C.), decane (b.p. 174° C.), octamethyl cyclotetrasiloxane (b.p. 175° C.).

The regenerable pleated filter media and/or filter element according to the present invention could be produced in several different sizes. Examples of sizes range from 100 mm×100 mm up to 1220 mm×1220 mm.

The regenerable pleated filter media or filter element is made from adsorbent incorporated into a heat resistant non woven fleece media that is pleated to enlarge the media area available for air flow. The adsorbent amount in the flat media is in the range 50-2000 g/m2, preferably between 100-1000 g/m2.

The nonwoven material could be made of PES or PES/PE, however any other polymer material could be used provided they are heat resistant up to the temperature required by the regeneration process.

The regenerable pleated filter media or filter element uses a pleat height of about 10 mm-600 mm and a pleat distribution of 2-20 pleats per 100 mm. The configuration is dependent on many factors including, but not limited to concentration of VOC in the inlet air, max effluent concentration, max pressure drop accepted and space.

The number of filter elements comprising a regenerable pleated filter media is typical 1-10. The number of filter elements are dependent on many factors including but not limited to the types of adsorbent deemed necessary for the intended application, the maximum permissible pressure drop, concentration of VOC in the air, max allowed effluent concentration and space limitations.

The regenerable pleated filter media or filter element must have a supportive grid, see FIG. 1-3, in order to provide support during the temperature cycles in the regeneration process. The support grid open area of 50-95%, preferable above 88% and having a thickness of 0.1-1.5 mm, preferable 0.5-0.8 mm. The grid ensures that the pleat configuration is kept intact during regeneration cycles. Without a support grid the regenerable pleated filter media or filter element would collapse when exposed to high temperature and flow.

The regenerable pleated filter media or filter element could use a heat resistant adhesive e.g. polyurethane to secure the media to avoid bypass leakage with the additional feature to resist material stresses during the regeneration cycle.

In further examples the regenerable pleated filter media is surrounded by a frame made of galvanized steel, stainless steel, acid proof steel, aluminium or anodized aluminium.

The regenerable pleated filter media or filter element uses an adsorbent of polymeric material or activated carbon material with an inner area of up to 3000 m²/g and with a micro/meso/macro pore volume depending on the application and gas to remove, typically between 0.2 and 0.8 cm³/g for the micropore volume.

The regenerable pleated filter media can be constructed in several different ways, i.e several different layers can be used:
Non-woven/adsorbent 1+fibers/adsorbent 2+fibers/adsorbent 3+fibers/etc/non-woven.
Non-woven/adsorbent 1+2+3+etc+fibers/non-woven
Non-woven/adsorbent 1+2+3+etc+fibers/non-woven/adsorbent 1+2+3+etc+fibers/non-woven/etc.
Non-woven/adsorbent 1+fibers/Non-woven/adsorbent 2+fibers/non-woven/etc.

In the above examples the grids are incorporated in the middle of the adsorbent layers or on at least one side on each of the non-woven layers.

Cloth or fabric is a flexible artificial material made up of a network of natural or artificial fibres (thread or yarn) formed by weaving or knitting (textiles), or pressed into felt. Non-woven is a material or a fabric made by a process not involving weaving. In this application, non-woven is a fabric made of fibers.

The fibers in the examples above can be replaced by temperature resistant adhesive or a combination of fibers and adhesives.

Figure 6:
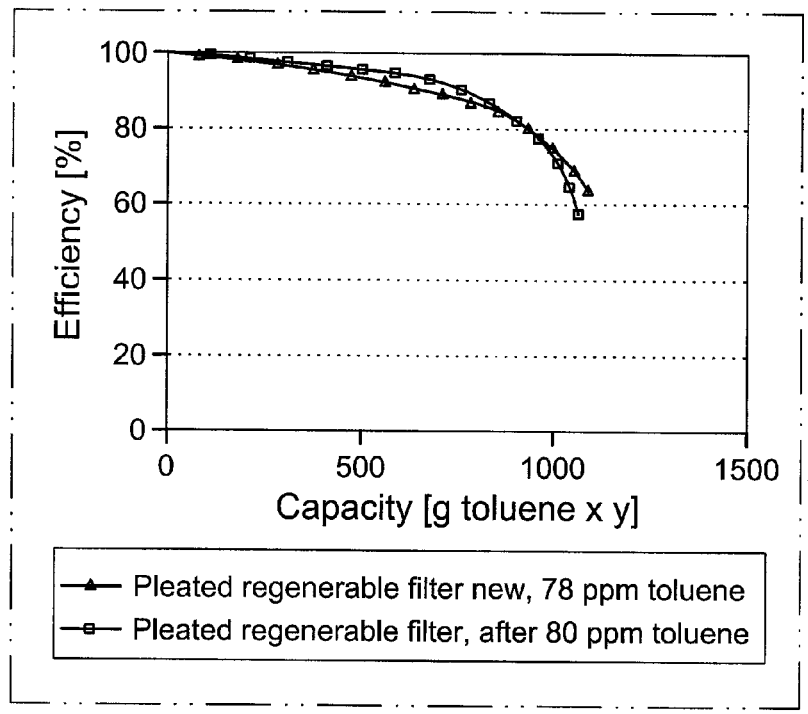
FIG. 6 shows the regeneration of a 3 layer regenerable pleated filter artificially loaded with Toluene or Isopropanol (IPA) followed by regeneration after 1 cycle.
Figure 7:
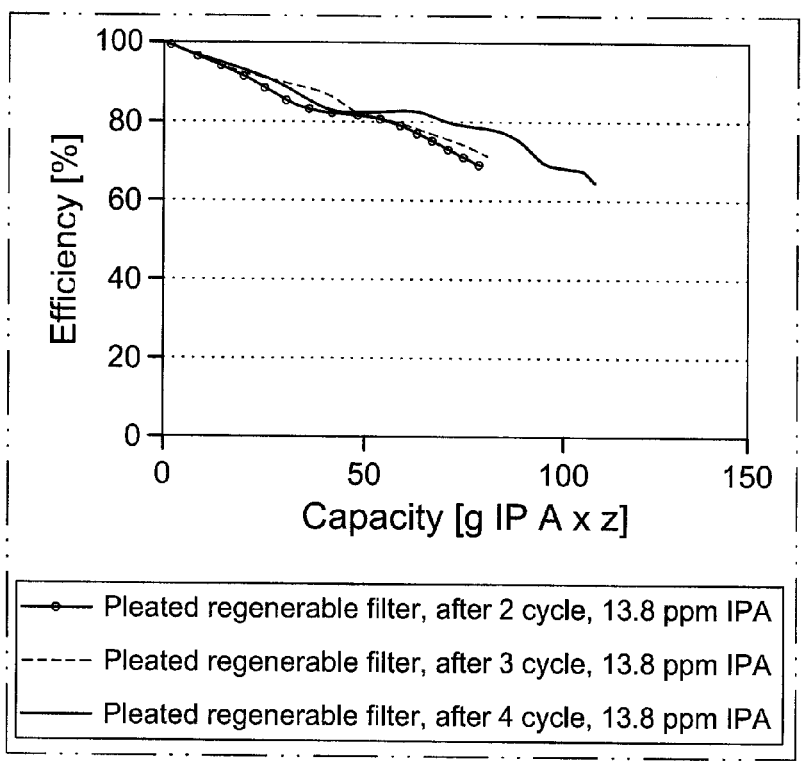
FIG. 7 shows the regeneration of a 3 layer regenerable pleated filter artificially loaded with Toluene or Isopropanol (IPA) followed by regeneration after 2-4 cycles.

A filter element comprises in one example a regenerable pleated filter media, a frame and a temperature resistant sealant. The different filter element could be used in the suitable a Regeneration Examples FIGS. 6 and 7 shows the regeneration of a 3 layer regenerable pleated filter media artificially loaded with Toluene or Isopropanol (IPA) followed by regeneration in total 4 cycles. FIG. 6 shows the result after 1 cycle. The filter media is loaded first with toluene and the efficiency of the filter for this particular contaminant is recorded. Once this challenge test is completed, the filter media is going through the regeneration process and the same challenge test with toluene is done again. Both curves are identical showing a full recovery of the capacity of the filter media for this contaminant. After these 2 tests, the same filter media is submitted to isopropanol and regenerated 2 more times, showing again full recovery of the performance.

The filter media was tested on a full scale air conditioned test rig and the concentrations were monitored online using a gas chromatograph flame ionization detector equipment. In this test 78 to 80 ppmv toluene and 13.8 ppm Isopropanol (IPA) were used.

Usually the filter media or the filter element is changed when the efficiency is in the interval 90% to 50%.

The temperature used for these regenerations was in the interval 100 to 180° C., with 180° C. being the preferred maximum temperature to use to reach a very fast and reliable regeneration.

Verification of the Results is Made by Using the Following Method:

The regenerable pleated filter media or filter element is used to remove VOC molecules of different size, volatility and boiling point and with different functional groups and/or non carbon or non hydrogen atoms in the molecule.

All such molecules will have different adsorption properties and possible reaction pathways on the adsorbent or during regeneration.

Some molecules will be extremely hard to remove and will over time, in use and over regeneration cycles, accumulate to form a non regenerable residue that limit the number of useful regeneration cycles and finally lead to replacement of the entire filter or filter component.

An in-house method under the trade name Gigamonitor uses extraction of residue followed by GC-FID/GC-MS based analysis to make an easily interpreted bar graph showing accumulated VOC amount in three different boiling point intervals.

This analysis is a reliable way to demonstrate the degree of regeneration and will be used to determine how many regeneration cycles that can be recommended for a particular application at a particular customer.

An alternative verification technique is to use exposure by a challenge VOC in a flow test rig to determine residual uptake capacity followed by an additional regeneration to remove the challenge VOC.

It is also possible to connect a FID on the outlet side of the regeneration equipment to measure the outgoing concentration of organic compounds. The value measured will indicate the end of the regeneration procedure for the given conditions of temperature, humidity, air flow and pressure. When no more gas is coming out of the equipment, the desorption is completed for these conditions. The only remaining test is to check the quantity of VOC which were not desorbed from the filter or make a challenge test, using the methods described above in this document.

Although the present invention has been described in considerable detail with reference to certain embodiments, one skilled in the art will appreciate that the present invention can be practiced by other than the described embodiments and examples, which have been presented for purposes of illustration and not of limitation. Therefore, the scope of the appended claims should not be limited to the description of the examples contained herein.

The invention claimed is:

1. An apparatus comprising:
a heat resistant pleated filter media, which does not release particles above ISO Class 6 environment according to standard ISO 14644-1, for a clean room environment, the pleated filter media regenerable by heated air flow above 125° C. at 1 atm, said pleated filter media being heat resistant to melting and burning for temperatures of up to at least 190° C., and including:
at least an adsorbent first layer of activated carbon or polymer wherein said activated carbon or polymer together with heat resistant fibers or an adhesion agent or a combination of heat resistant fibres and adhesion agent is enclosed between two second heat resistant layers of heat resistant non-woven with a heat resistant support grid positioned on at least one side of either of the second layers or incorporated in the first layer for preventing deformation of the pleated filter media when regenerated by a heated air flow above 125° C. at 1 atm.

2. The apparatus according to claim 1, wherein an adsorbent in the layer of activated carbon has a shape of, fiber, powder, granular, pellet or beads.

3. The apparatus according to claim 1, wherein the activated carbon is chosen from coal, coconut, polymers, and naphtha and further polymer adsorbent such as a macroporous styrene-divinyl benzene.

4. The apparatus according to claim 1, wherein the grid is made from aluminium, steel or high temperature resistant plastic material.

5. A pleated filter media for a clean room environment according to claim 1, wherein the grid has an open area of 50-95% of a total area.

6. The apparatus according to claim 5, wherein the grid is made in a shape of a net.

7. The apparatus according to claim 1, wherein a pressure drop over a flat media is up to 75 Pa at 0.11 m/s air face velocity.

8. The apparatus according to claim 1, wherein the fibers are heat resistant bi-component fibers.

9. The apparatus according to claim 1, wherein an adsorbent is made of polymeric material or an activated carbon material with an inner area of 500 $m^2$/g to 3000 $m^2$/g and with a micropore volume of 0.2 $cm^3$/g to 0.8 $cm^3$/g.

10. The apparatus according to claim 1, wherein at least two different adsorbents are selected and used in different layers within a filter element to match an intended mixture of volatile organic compounds to be removed.

11. The apparatus according to claim 1, further comprising a frame.

12. The apparatus according to claim 11, further comprising a temperature resistant sealant.

13. The apparatus according to claim 1, wherein a second pleated filter media is positioned in series with the heat resistant regenerable pleated filter media.

14. The apparatus according to claim 1, wherein all of the materials of the heat resistant pleated filter media are resistant to melting or burning for temperatures up to 200° C.

15. The apparatus according to claim 1, wherein the pleated filter media is regenerable by heated air flow above 150° C. at 1 atm.

16. A method comprising:
providing a pleated filter media, which does not release particles above ISO Class 6 environment according to standard ISO 14644-1, for a clean room environment in the microelectronic industry, bare wafer manufacturing, semiconductor industry, printed circuit board assembly, hard disk manufacturing, flat panel manufacturing, biochips manufacturing, pharmaceutical industry, food industry, hospital clean environments, IVF laboratories, solar panel manufacturing laboratory, or for cabinets and fume hoods air systems;
wherein providing the pleated filter media includes providing an apparatus including:
a heat resistant regenerable pleated filter media for a clean room environment said pleated filter media being heat resistant to melting and burning for temperatures of at least 190° C., and including:
at least an adsorbent first layer of activated carbon or polymer wherein said activated carbon or polymer together with heat resistant fibers or an adhesion agent or a combination of heat resistant fibres and adhesion agent is enclosed between two second heat resistant layers of heat resistant non-woven with a heat resistant grid positioned on at least one side of either of the second layers or incorporated in the first layer for preventing deformation of the pleated filter media when regenerated by a heated air flow above 125° C. at 1 atm, the method further including:

filtering by removing Airborne Molecular Contamination (AMC) in the form of organic Acids, organic Bases, Condensables, Dopants, Oxidants, Volatile Organic Compounds (VOC) and all compounds which can be adsorbed by physical adsorption inside a porous structure of the adsorbent first layer.

* * * * *